Patented Feb. 20, 1940

2,191,432

UNITED STATES PATENT OFFICE 2,191,432

P-CARBAMIDOBENZENESULFONAMIDE AND PROCESS OF PRODUCING IT

Morris S. Kharasch and Otto Reinmuth, Chicago, Ill., assignors to Eli Lilly and Company, Indianapolis, Ind., a corporation of Indiana No Drawing. Application January 23, 1937, Serial No. 121,977

4 Claims. (Cl. 260—553)

Our invention relates to the new product p-carbamidobenzenesulfonamide, and to the process of producing it.

Our new final product, p-carbamidobenzenesulfonamide, has been found to be of low toxicity, and to be efficacious, both on oral and on parenteral administration, for the treatment of streptococcic and other infections, especially those of great virulence. Effective oral dosages in adult human cases are of the order of 100–1000 mg., and effective parenteral dosages of the order of 50–500 mg.

The new p-carbamidobenzenesulfonamide has the following formula:

(1) 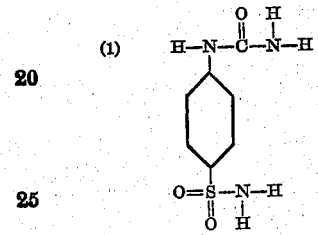

It is a white crystalline solid. It is moderately soluble in cold water, and very soluble in hot water. It is rather more soluble in alcohol, ethylene glycol, and propylene glycol, either hot or cold, than in water. It is quite insoluble in ether and in benzene. It melts, with decomposition, at 172°–173° C. (uncorrected). It is stable when heated in acid or neutral water solution.

To prepare this new product, we may proceed in either of two ways.

Method A. To a water suspension of p-aminobenzenesulfonamide we add a water solution of slightly more than a molecular equivalent of a suitable water-soluble cyanate, such as potassium cyanate; and make slightly acid, as with hydrochloric or sulfuric acid. The yield is good.

The following equation indicates the course of the reaction:

(2) 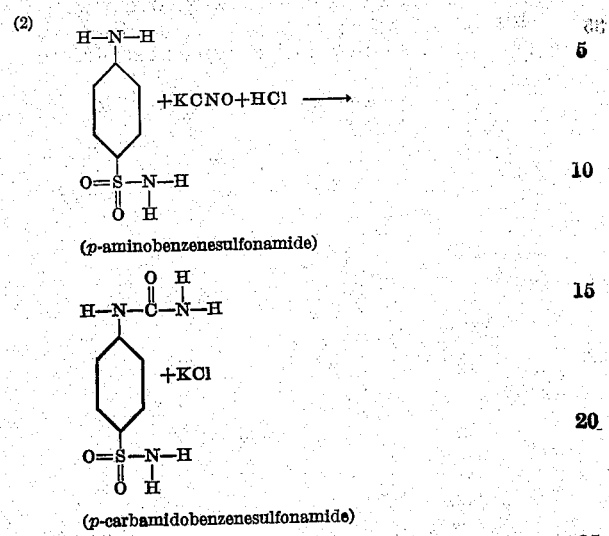

The p-carbamidobenzenesulfonamide thus formed is suitably collected, as on a filter.

An example of Method A is as follows:

Thirty-six (36) gms. of p-aminobenzenesulfonamide is suspended in about 100 cc. of water, and a solution of 16 gms. of potassium cyanate in about 200 cc. of water is added to it. To this mixture, or to either ingredient of it before the mixture is made, there is now added 1 molecular equivalent of hydrochloric acid. The reaction indicated by equation 2 above takes place readily, at room or slightly elevated temperature. The desired p-carbamidobenzenesulfonamide formed is now separated by filtration, and crystallized from water.

Method B. Method B is the same as Method A, save that instead of using a cyanate we use nitrourea, with either alcohol or water as the solvent. The reaction is complete when the evolution of gas (nitrous oxide) ceases, which usually requires about two hours. The yield is good. The following equation indicates the course of the reaction.

(3) 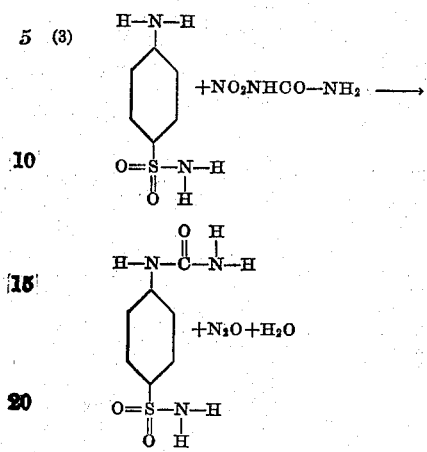

When using nitrourea, it is not necessary to add hydrochloric acid.

The following is an example of Method B:

Seventeen and two-tenths (17.2) gms. of p-aminobenzenesulfonamide is suspended in about 50 cc. of water or alcohol, and a solution of 10.6 gms. of nitrourea in about 20 cc. of alcohol or warm water is slowly added to it. The reaction indicated by equation 3 above takes place readily, especially on warming. The desired p-carbamidobenzenesulfonamide formed is now separated by filtration, and crystallized from water.

This final product is effective, on either oral or parenteral administration, to combat streptococcic and other infections. It may be administered orally in tablet form, or in suspension or solution in any non-toxic menstruum. It may be administered subcutaneously, intravenously, or intramuscularly in any suitable non-toxic solvent; for which we find the glycols, especially propylene glycol, mixed with water if desired, very advantageous.

We claim as our invention:

1. The new product p-carbamidobenzenesulfonamide, which is represented by the following formula:

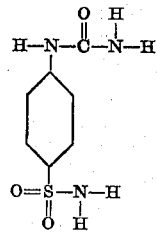

2. The process of making p-carbamidobenzenesulfonamide, which consists in treating p-aminobenzenesulfonamide with a reagent of the class consisting of water-soluble cyanates in acid solution and nitrourea in solution.

3. The process of making p-carbamidobenzenesulfonamide, which consists in treating p-aminobenzenesulfonamide with a water-soluble cyanate in acid solution.

4. The process of making p-carbamidobenzenesulfonamide, which consists in treating p-aminobenzenesulfonamide with nitrourea.

MORRIS S. KHARASCH.
OTTO REINMUTH.